United States Patent [19]
Watanabe

[11] Patent Number: 5,610,781
[45] Date of Patent: Mar. 11, 1997

[54] INTERCHANGEABLE EJECT MECHANISM FOR USE WITH VARIOUS DISK DRIVE UNITS

[75] Inventor: Takashi Watanabe, Ichikawa, Japan

[73] Assignee: TEAC Corporation, Japan

[21] Appl. No.: 384,698

[22] Filed: Feb. 6, 1995

Related U.S. Application Data

[63] Continuation of Ser. No. 60,241, May 11, 1993, abandoned.

[30] Foreign Application Priority Data

May 13, 1992 [JP] Japan ................................. 4-120802

[51] Int. Cl.⁶ ........................................... G11B 17/04
[52] U.S. Cl. ................................. 360/99.06; 360/99.02; 369/77.2
[58] Field of Search ........................... 360/99.06, 99.07, 360/99.02, 137; 369/77.2, 77.1, 75.2

[56] References Cited

U.S. PATENT DOCUMENTS

| | | | |
|---|---|---|---|
| 4,635,149 | 1/1987 | Okita et al. | 360/99.06 |
| 4,692,828 | 9/1987 | Noda et al. | 360/97 |
| 4,724,497 | 2/1988 | Takeda et al. | 360/99.06 |
| 4,734,801 | 3/1988 | Takeda et al. | 360/99.06 |
| 4,833,553 | 5/1989 | Noda et al. | 360/99.06 |
| 4,878,139 | 10/1989 | Hasegawa et al. | 360/99.06 |
| 5,243,480 | 9/1993 | Tangi et al. | 360/99.06 |
| 5,297,117 | 3/1994 | Uzuki et al. | 369/77.2 |

FOREIGN PATENT DOCUMENTS

| | | | |
|---|---|---|---|
| 60-63760 | 4/1985 | Japan | 360/99.07 |
| 4115391 | 10/1992 | Japan . | |

*Primary Examiner*—Stuart S. Levy
*Assistant Examiner*—Kevin M. Watkins
*Attorney, Agent, or Firm*—Andrus, Sceales, Starke & Sawall

[57] ABSTRACT

A disk drive unit has a main body including a loading/ejecting mechanism for loading a recording disk set at an initial position to a loading position and for returning the recording disk from the loading position to the initial position, the loading/ejecting mechanism being provided with a plurality of coupling portions each of which is to be coupled to operation mechanism for operating the loading/ejecting mechanism, a driving mechanism for driving the recording disk set at the loading position by the loading/ejecting mechanism, and a head assembly for recording and/or reproducing information to and/or from the recording disk set at the loading position. The disk drive unit also has a mechanical operation unit, coupled to one of the plurality of coupling portions of the loading/ejecting mechanism, for operating the loading/ejecting mechanism so that the recording disk is returned from the loading position to the initial position.

8 Claims, 8 Drawing Sheets

INTERCHANGEABLE EJECT MECHANISM FOR USE WITH VARIOUS DISK DRIVE UNITS

This application is a continuation application of Ser. No. 08/060,241 filed May 11, 1993, now abandoned.

BACKGROUND OF THE INVENTION

1. Field of the invention

The present invention generally relates to a disk drive unit, such as a flexible magnetic disk drive unit, and more particularly to a disk drive unit capable of sharing a main body thereof with another type of disk drive unit.

2. Description of the related art

A magnetic disk drive unit into which a disk case housing a recording disk, such as a flexible magnetic disk, is to be loaded has a holder and a slider. The disk case is loaded in the magnetic disk drive unit in a state where the disk case is inserted into the holder. The slider is slidably provided between the holder and a frame rotatably supporting a turn-table. Due to the insertion operation of the disk case into the magnetic disk drive unit, a latch lever is released from the slider and the slider slides on the frame while being guided by guide pins on the frame. The frame is mounted with a cover member covering the holder. The slider is linked to an ejection mechanism for ejecting the disk case from an insertion opening. The ejection mechanism has an ejecting button which is provided near the insertion opening and on either a top plate of a housing of the magnetic disk drive unit or on a bottom surface plate of the housing thereof.

In the above conventional magnetic disk drive unit, it is necessary to form a space between the holder and the frame enough to provide the slider and the guide pins projecting from the frame. In addition, there is provided a space between the holder and the cover member so that when the holder goes up to an insertion position, a magnetic head moves upward and to the space between the holder and the cover member.

It is desired that the magnetic disk drive unit be made thin. Thus, it is important to reduce spaces in the housing in a height direction. Hence, the applicant has proposed the following magnetic disk drive unit in Japanese Patent Laid Open Application No.4-119555. That is, the slider is provided between the holder and the cover member so that a surface of the turn-table, on which surface the disk is to be set, is made to be close to the frame. In addition, the ejecting button is provided at a side of the insertion opening.

As described above, there are various types of magnetic disk drive unit. A first type of magnetic disk drive unit is provided with the ejecting button positioned at either the upper side of the insertion opening or the lower side of the insertion opening. A second type of magnetic disk drive unit is provided with the ejecting button positioned at a side of the insertion opening. In a conventional production process of the magnetic disk drive unit, parts of the first type of magnetic disk drive unit and corresponding parts of the second type of magnetic disk drive unit differ from each other. Hence, a production line through which the first type of magnetic disk drive unit is to be produced and a production line through which the second type of magnetic disk drive unit also differ from each other. Thus, there is a problem in that the productivity of the first and second types of magnetic disk drive units decreases.

SUMMARY OF THE INVENTION

Accordingly, a general object of the present invention is to provide a novel and useful disk drive unit in which the disadvantages of the aforementioned prior art are eliminated.

A more specific object of the present invention is to provide a disk drive unit capable of sharing a main body thereof with another type of disk drive unit.

The above objects of the present invention are achieved by a disk drive unit comprising: (a) a main body comprising: (a-1) a loading/ejecting mechanism for loading a recording disk set at an initial position to a loading position and for returning the recording disk from the loading position to the initial position, the loading/ejecting mechanism being provided with a plurality of coupling portions each of which is to be coupled to operation means for operating the loading/ejecting mechanism; (a-2) a driving mechanism for driving the recording disk set at the loading position by the loading/ejecting mechanism; and (a-3) a head assembly for recording and/or reproducing information to and/or from the recording disk set at the loading position; and (b) operation means, coupled to one of the plurality of coupling portions of the loading/ejecting mechanism, for operating the loading/ejecting mechanism so that the recording disk is returned from the loading position to the initial position.

According to the present invention, as the main body can be shared with another type of disk drive unit, the manufacturing of a plurality of types of disk drive units can be improved.

Additional objects, features and advantages of the present invention will become apparent from the following detailed description when read in conjunction with the accompanying drawings.

DESCRIPTION OF THE PREFERRED EMBODIMENTS

Figure 1:
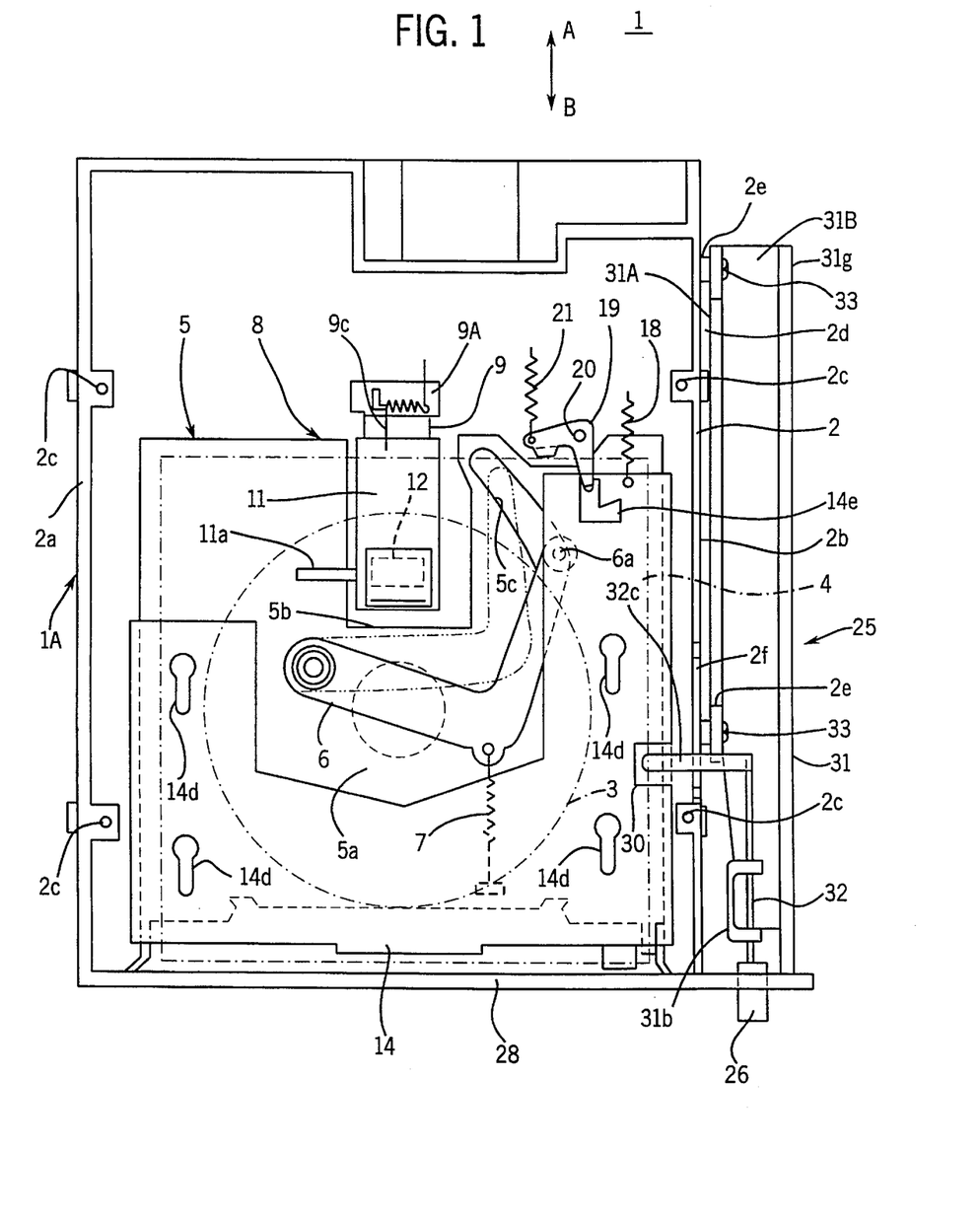
FIG. 1 is a plan view illustrating an internal structure of a disk drive unit according to an embodiment of the present invention.

A description will now be given of an embodiment of the present invention. FIG. 1 shows an internal structure of a magnetic disk drive unit according to an embodiment of the present invention. In FIG. 1, a cover plate 13 which will be described later is omitted.

Figure 2:
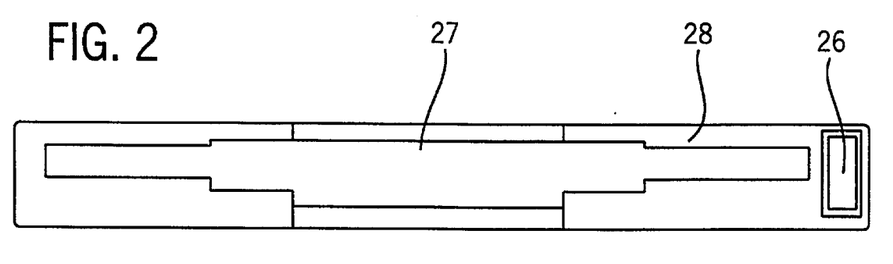
FIG. 2 is a front view illustrating a first type of disk drive unit having an eject button provided at the side of an insertion opening through which a disk case is to be inserted.

Referring to FIG. 1, a magnetic disk drive unit 1 has a frame 2 and an ejecting operation unit 25. The frame 2 and other parts mounted thereon form a main body 1A of the magnetic disk unit 1. The ejecting operation unit 25 is fixed on mounting bosses 2e formed on a side wall 2b of the frame 2 by screws 33. In this type of magnetic disk drive unit, a front bezel 28 on which an insertion opening 27 is formed is provided at the front side of the frame 2 so that an operation button 26 of the ejecting operation unit 25 projects from the front bezel 28 at the right side of the insertion opening 27, as shown in FIG. 2.

The structure of the main body 1A of the magnetic disk drive unit 1 will be described with reference to FIGS. 1 through 7 below.

Figure 5:
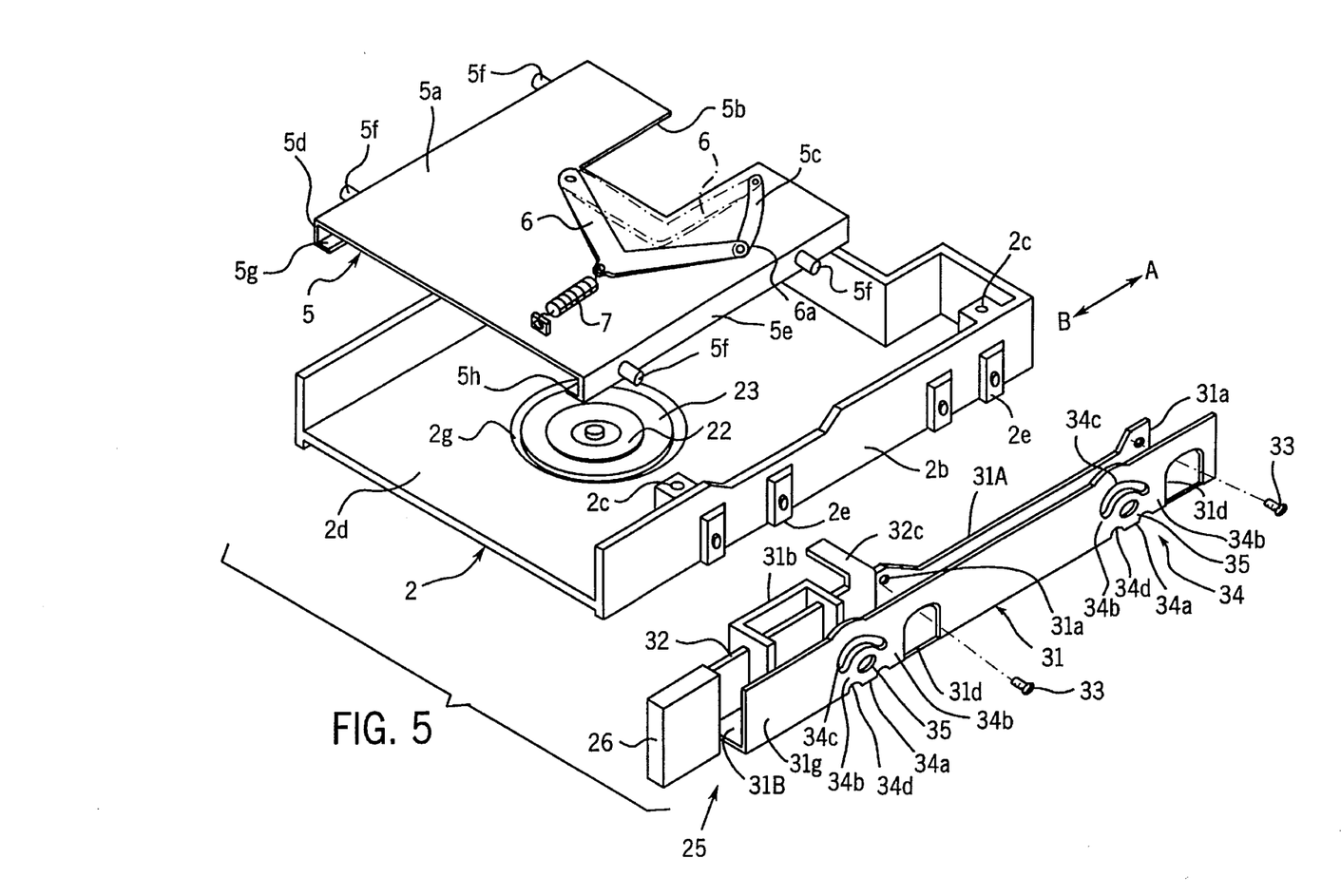
FIG. 5 is an exploded perspective view illustrating the holder, a frame and an ejecting operation unit.

A holder 5 into which a disk case 4 housing a magnetic disk 3 (e.g. a flexible disk) is to be inserted as shown by a chain line in FIG. 1 is provided in the frame 2. The holder 5 is movably supported by a supporting mechanism so as to move upward due to an ejecting operation and to move downward due to a loading operation. The holder 5 has, as shown in FIG. 5, a top plate 5a and side plates 5d and 5e which project from side edges of the top plate 5a. The side plates 5d and 5e are respectively provided with flanges 5g and 5h so as to face the top surface 5a so as to be parallel thereto. The disk case 4 is inserted into the holder 5 while being supported and guided by the flanges 5g and 5h. The top plate 5a of the holder 5 is provided with an opening 5b formed thereon. A magnetic head assembly 8 mounted on the frame 2 is located in the opening 5b formed on the top plate 5a of the holder 5, as shown in FIG. 1. An L-shaped shutter lever 6 is mounted on the top plate 5. An end of the shutter lever 6 is pivotably supported on a shaft projecting from the top plate 5a of the holder 5. The shutter lever 6 is usually pulled in a clockwise direction by a spring 7. Another end of the shutter lever 6 is provided with an engaging pin 6a projecting through an arc-shaped opening 5c formed on the top plate 5a of the holder 5 to the inside of the holder 5. The arc-shaped opening 5c has a shape corresponding to the locus of the engaging pin 6a. When the disk case 4 is inserted into the holder 5, the engaging pin 6a is engaged to a shutter of the disk case 4. The shutter lever 6 is pivoted with the insertion of the disk case 4 and the shutter of the disk case 4 is opened by the engaging pin 6a engaged thereto. In a state where the shutter of the disk case 4 is opened, the magnetic disk 3 emerges from the disk case 4. The side plates 5d and 5e are provided with a projection pins 5f.

Figure 6:
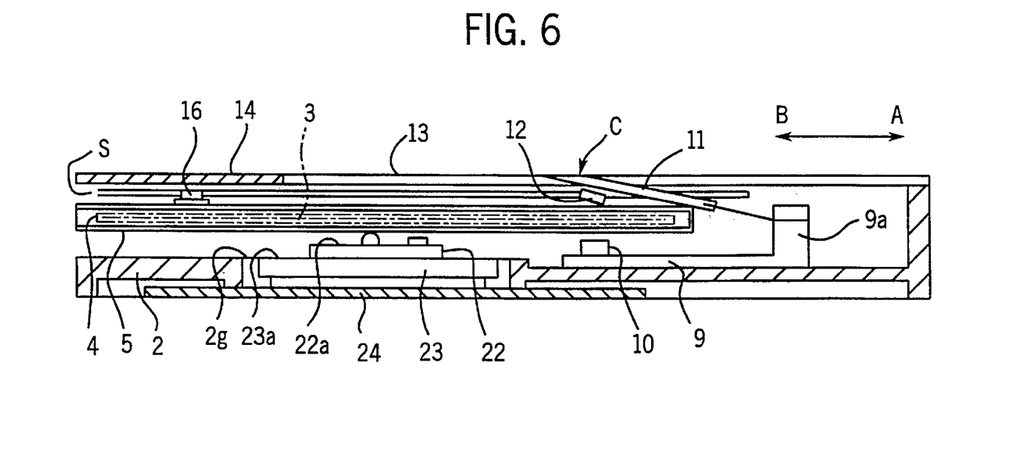
FIG. 6 is a sectional side view illustrating the disk drive unit under a condition in which a disk case is inserted thereinto.

The magnetic head assembly 8 to be located in the opening 5b of the holder 5 comprises a carriage 9, a lower magnetic head 10, an arm 11 and an upper magnetic head 12, as shown in FIGS. 1 and 6. The carriage 9 is mounted on the frame so as to be able to move in directions A and B (see FIG. 6) approximately parallel to the radius of the magnetic disk. The lower magnetic head 10 is mounted at the leading end position on an upper surface of the carriage 9. The arm 11 is pivotably supported by a base end block 9a of the carriage 9. The upper magnetic head 12 is mounted at the leading end position on a lower surface of the arm 11. The carriage is engaged with a leading screw (not shown) driven by a stepping motor (not shown), and the carriage 9 moves in accordance with the rotation of the leading screw so that the lower magnetic head 10 and the upper magnetic head 12 are made to move in tracking directions of the magnetic disk 3. A spring force of the torsion spring 9c provided on the base end block 9a of the carriage 9 acts on the arm 11 in a direction C shown in FIG. 6. The arm 11 is provided with a rod 11a projecting from a side edge thereof. The rod 11a is in contact with the top plate 5a of the holder 5 and is supported thereby. In a state where there is no disk case in the holder 5, the holder 5 is made to go up, so that the upper magnetic head 12 is kept away from the lower magnetic head 10.

Figure 4:
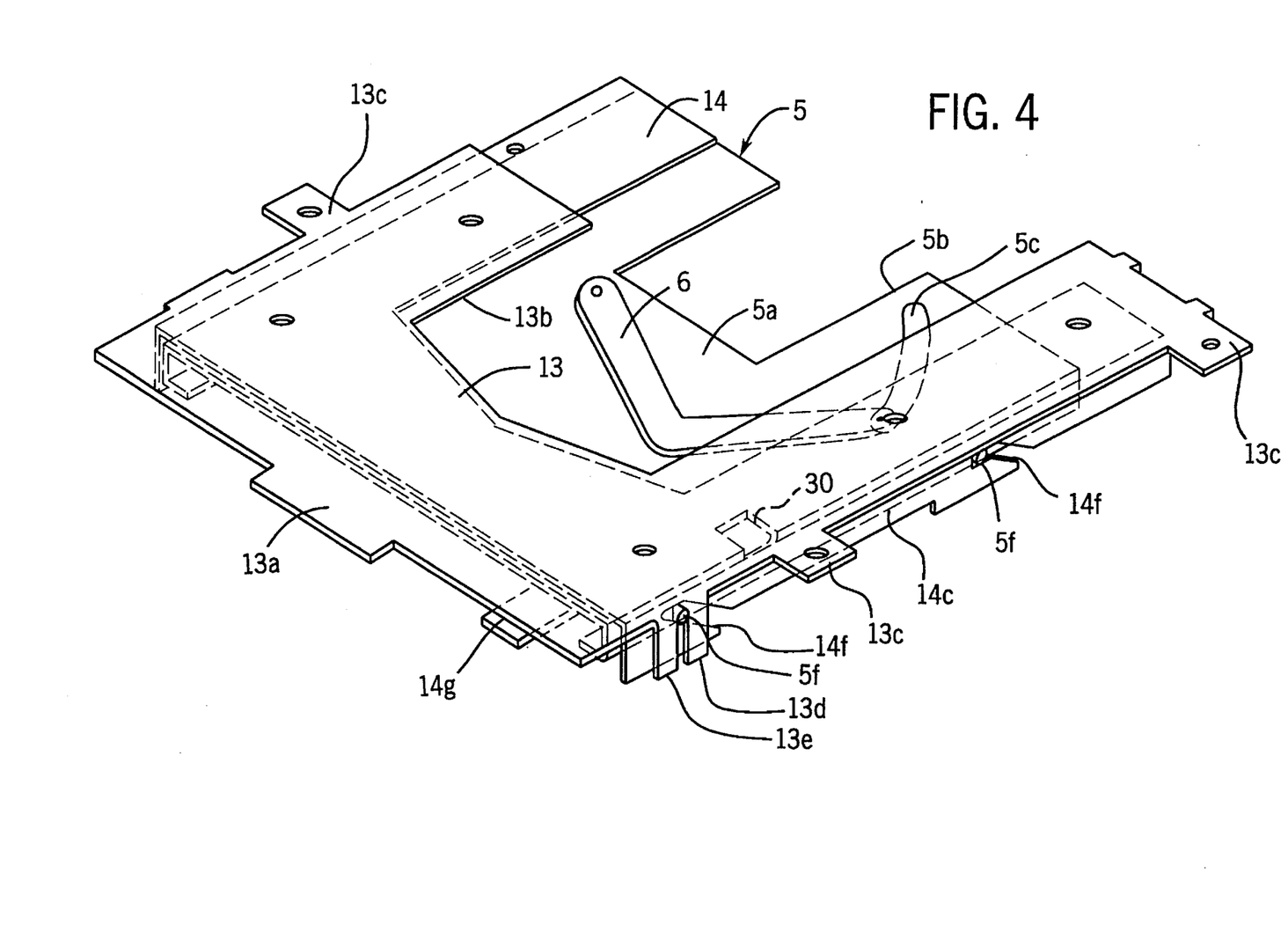
FIG. 4 is a perspective view illustrating a combination of a holder, a slider and a cover plate.
Figure 7:
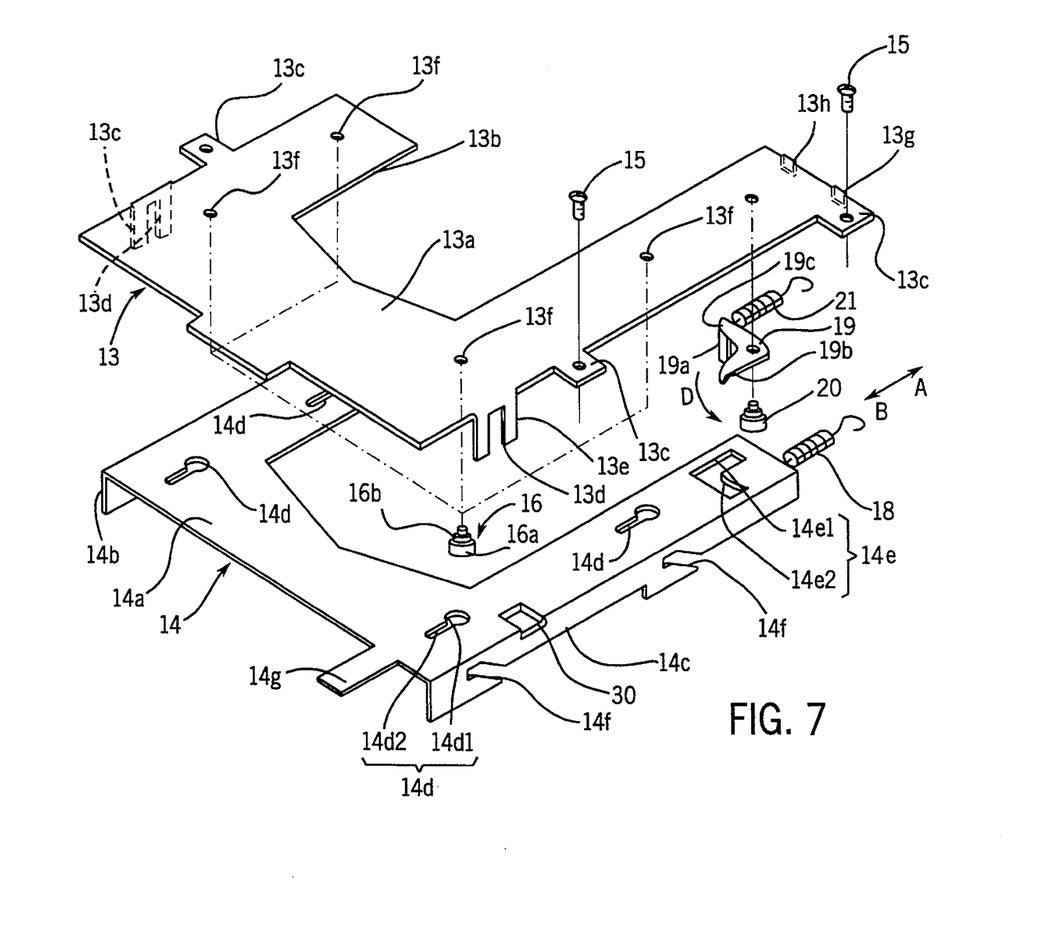
FIG. 7 is an exploded perspective view illustrating the holder and the frame.

The slider 14 and the cover plate 13 are integrated with the holder 5, as shown in FIG. 4, so that the slider 14 covers the holder 5 and the cover plate 13 further covers the slider 14 and the holder 5. The cover plate 13 is formed, as shown in FIG. 7, of a main plate 13a, mounting plates 13c, and guide plates 13e. An opening 13b is formed on the main plate 13a so that the main plate 13a is approximately J-shaped. The mounting plates 13c project from the side edges of the main plate 13a in a direction parallel to the surface of the main plate 13a. Holes are formed on the mounting plates 13c and the cover plate 13 is mounted on the frame 2 by screws 15 through the holes of the mounting plates 13c. The guide plates 13e project from the side edges of the main plate 13a in a direction perpendicular to the surface of the main plate 13a. Each of the guide plates 13e has a slit 13d with which a corresponding one of the pins 5f projecting from the side plates 5d and 5e of the holder 5 is to be engaged. Stopper plates 13g and 13h project from a rear end edge of the main plate 13a in a direction perpendicular to the surface of the main surface 13a. Holes 13f are formed at predetermined positions on the main plate 13a.

The slider 14 is formed as shown in FIG. 7. That is, the slider 14 has a top plate 14a which is U-shaped and side plates 14b and 14c projecting downward from side edges of the top plate 14a. An engaging opening 30, which is to be engaged with an engaging plate 32c of the ejecting operation unit 25 as will be described later, is formed at a predetermined position on an boundary area between the top plate 14a and the side plate 14c projecting from the right side edge of the top plate 14a. The top plate 14a of the slider 14 is provided with slotted holes 14d each of which is formed at a position corresponding to one of the holes 13f formed on the main plate 13a of the cover plate 13. Each of slotted holes 14d is constituted of a slot 14d2 and a hole 14d1 both of which are connected to each other. Guide pins 16 are tightly engaged with holes 13f of the cover plate 13 so as to project from the cover plate 13. Each of the guide pins 16 has a first part 16a having a large diameter and a second part 16b having a small diameter. The first part 16a of each of the guide pins 16 can pass through the hole 14d1 of each of slotted holes 14d but cannot pass through the slot 14d2 of each thereof. The second part 16b of each of the guide pins 16 can pass through both the hole 14d1 and the slot 14d2 of each of the slotted hole 14d. Due to the above structure of the guide pins 16, the guide pins 16 which are fixed on the cover plate 13 are roughly engaged with the slots 14d2 of the slotted holes 14d formed on the top plate 14a of the slider 14, so that the slider 14 is slidably supported by the guide pins 16 projecting from the cover plate 13.

The top plate 14a of the slider 14 is provided with an L-shaped engaging hole 14e formed at a rear end portion of the top plate 14a. The engaging hole 14e is constituted of a slot 14e1 extending in a direction parallel to the directions A and B in which the slider 14 moves and an engagement portion 14e2 extending in a direction perpendicular to the direction in which the slot 14e1 extends. Each of the side plates 14b and 14c is provided with inclined slits at predetermined positions corresponding to positions at which the pins 5f project from the side plates 5d and 5e of the holder 5. A mounting part 14g on which the ejecting button 26 is to be mounted projects from the front edge of the top plate 14a of the slider 14 in a direction parallel to the surface of the top plate 14a. In this type of magnetic disk driver unit, since the ejecting operation unit 25 is connected to the frame 2, the ejecting button 26 is not mounted on the mounting part 14g of the slider 14.

A spring 18 is provided between the rear end portion of the slider 14 and the stopper plate 13g of the cover plate 13 so that the slider 14 is usually pressed by the spring force of the spring 18 in the direction B. A latch lever 19 which is L-shaped is pivotably supported by a pin 20 projecting from the cover plate 13. The latch lever 19 is constituted of a stopper 19a on which the disk case 4 is to hit, an engagement portion 19b to be engaged with the engaging hole 14e formed on the slider 14 and a mounting portion 19c on which an end of a spring 21 is to be fixed. The spring 21 is provided between the mounting portion 19c of the latch lever 19 and the stopper plate 13h of the cover plate 13 so that the latch lever 19 is usually pressed by the spring 21 in a counterclockwise direction D. When the slider 14 is moved by the ejecting operation in the direction A, the latch lever 19 is rotated in the counterclockwise direction D and the engagement portion 19b is engaged with the engagement portion 14e2 of the engaging hole 14e formed on the slider 14. As a result, the slider 14 is latched by the latch lever 19 at a predetermined position.

The cover plate 13, the slider 14, the latch lever 19, the springs 18 and 21 are assembled as described above. Further, the holder 5 is set into the slider 14 and the pins 5f of the holder 5 are engaged with the inclined slits 14f of the slider 14 and the engaging plate 13e of the cover plate 13. As a result, the cover plate 13, the slider 14 and the holder 5 are assembled into one assembly as shown in FIG 4. In a production process of the magnetic disk drive unit, the assembly is mounted on the frame 2. Thus, the main body 1A of the magnetic disk drive unit 1 can be efficiently assembled in a short time.

Figure 9:
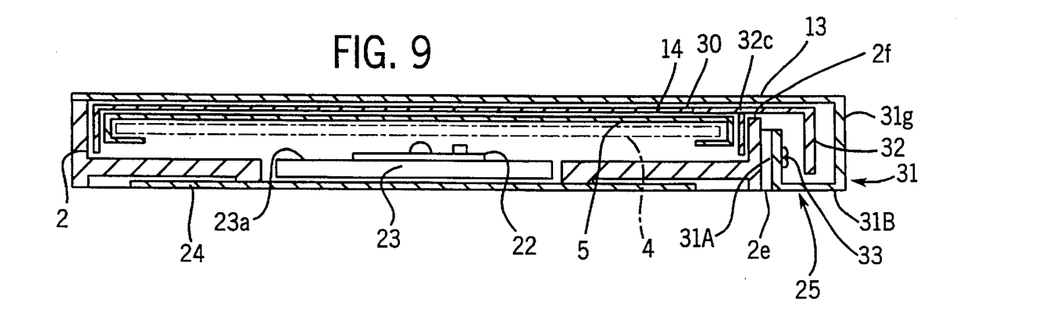
FIG. 9 is a sectional front view illustrating the disk drive unit under a condition in which the disk case is inserted thereinto.

In a state where the disk case 4 is not in the holder 5, the holder 5 is lifted up and positioned at a pre-insertion position, as shown in FIGS. 6 and 9. At this time, since the rod 11a of the arm 11 is in contact with the surface of the top plate 5a of the holder 5, the arm 11 of the magnetic head assembly 8 is lifted up along with the holder 5. That is, there is a space S enough for the arm 11 to be lifted up between the holder 5 and the cover plate 13. In this embodiment, as the slider 14 is provided in the space S between the holder 5 and cover plate 13, the pre-insertion position at which the holder 5 is positioned before the disk case 4 is inserted into the holder can be lowered in the frame 2. As a result, the main body 1A of the magnetic disk drive unit 1 can be made thin.

A hole 2g is formed on a bottom plate 2d of the frame 2 so as to face the holder 5. The hole 2g is covered by a base plate 24 from the rear surface of the bottom plate 2d. A flat motor 23 is mounted on the base plate 24 so as to be located in the hole 2g. The flat motor 23 has a driving coil and a rotor 23a. A turn-table 22 on which the magnetic disk 3 in the disk case 4 inserted in the holder 5 positioned at a loading position is to be put is mounted on the rotor 23a of the flat motor 23. The turn-table 22 is rotated at a constant speed by the flat motor 23. The turn-table 22 slightly projects from the surface of the bottom plate 2d of the frame 2. The loading position of the holder 5 is lowered along with the lowering of the pre-insertion position of the holder 5 as described above. In this case, the difference in level between the surface 22a of the turn-table 22 and the surface of the bottom plate 2d can be decreased. That is, the main body 1A of the magnetic disk drive unit 1 can be made more thin.

Figure 8:
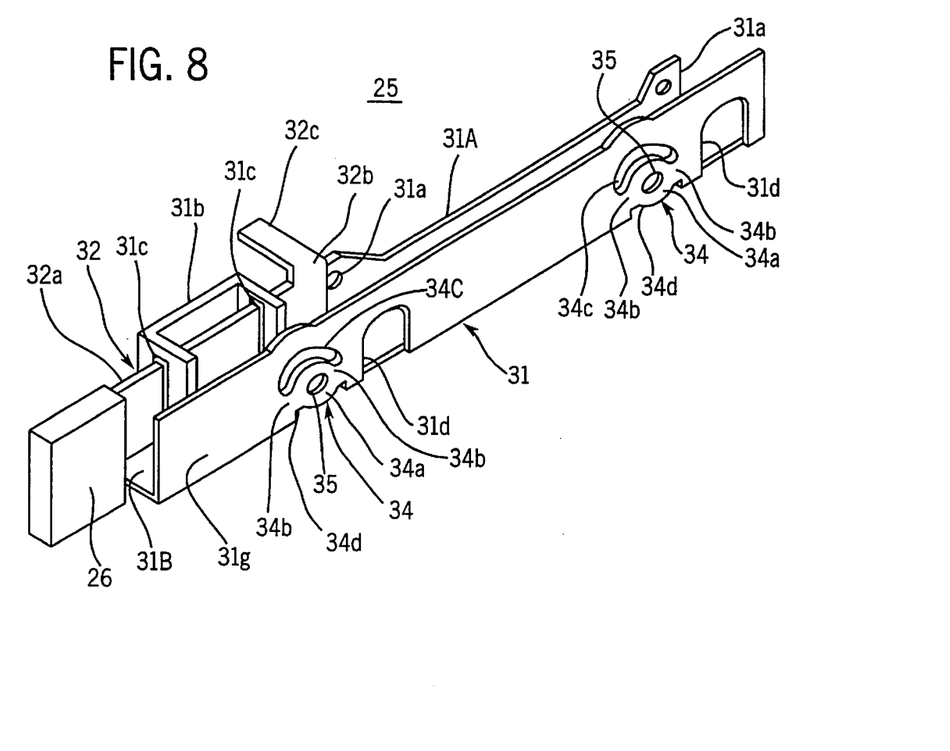
FIG. 8 is a perspective view illustrating the ejecting operation unit.

The ejecting operation unit 25 to be fixed on the mounting bosses 2e of the frame 2 is formed as shown in FIGS. 5 and 8.

Referring to FIGS. 5 and 8, the ejecting operation unit 25 has a sub-frame 31, an operating lever 32 and the eject button 26 mounted on the end of the operating lever 32. A cross sectional view of the sub-frame 31 in a direction perpendicular to the longitudinal direction is approximately U-shaped, and has a bottom plate 31f and inner wall 31e and an outer wall 31g which walls project upward from the side edges of the bottom plate 31f. The inner wall 31e is provided with passing holes 31a through which pass screws 33 to be in the mounting bosses 2e of the frame 2. A supporting frame 31b is fixed on the bottom plate 31f of the sub-frame 31 (the supporting frame 31b and the sub-frame 31 may be formed in one united body). The supporting frame 31b has plates approximately perpendicular to the inner wall 31e and to the outer wall 31g, the plates having slits 31c through which the operating lever 32 passes. That is, the operating lever 32 is supported by the supporting frame 31b so as to be slidable in the directions A and B parallel to a direction in which the sub-frame 31 extends. The ejecting button 26 is tightly mounted on a first end portion of the operating lever 32, which end portion projects from the end of the sub-frame 31. At a second end portion of the operating lever 32, an engaging plate 32c is formed so as to extend in a direction perpendicular to a direction in which the operating lever 32 extends. In a state where the sub-frame 31 is fixed on the mounting bosses 2e of the frame 2, the engaging plate 32c of the operating lever 32 is engaged with the engaging opening 30 of the slider 14. To cause the engaging plate 32c of the operating lever 32 to be linked to the slider 14, a concave portion 2f is formed on an edge of the side plate 2b so that the engaging plate 32c passes through it.

Tool insertion windows 31d are formed on the outer wall 31g so as to face the holes 31a formed on the inner wall 31e. A tool, such as a screwdriver, is made to pass through the tool insertion window 31d, the screws 31 are fastened by the tool. Mounting portions 34 are provided near the tool insertion windows 31d on the outer wall 31g. The mounting portions 34 are used for mounting the magnetic disk drive unit in an equipment such as a personal computer. In each of the mounting portions 34, a tapped hole 35 is formed and an arc-shaped hole 34c and notches 34d are formed so as to surround the tapped hole 35. As a result, a circle plate 34a and connecting plates 34b are formed in each of the mounting portions 34. When a screw inserted in the tapped hole 35 is fastened by too much force in order to mount the magnetic disk drive unit 1 on a predetermined plate in the equipment, the connecting plates 34b are elastically deformed. Thus, even if the sub-frame 31 is slightly roughly made and attached to the frame 2, due to the elastic deformation of the connecting plates 34b of each of the mounting portion 34, the magnetic disk drive unit 1 can be mounted in the equipment so that the mounting portions 34 are precisely positioned at predetermined positions on the plate in the equipment.

Figure 10:
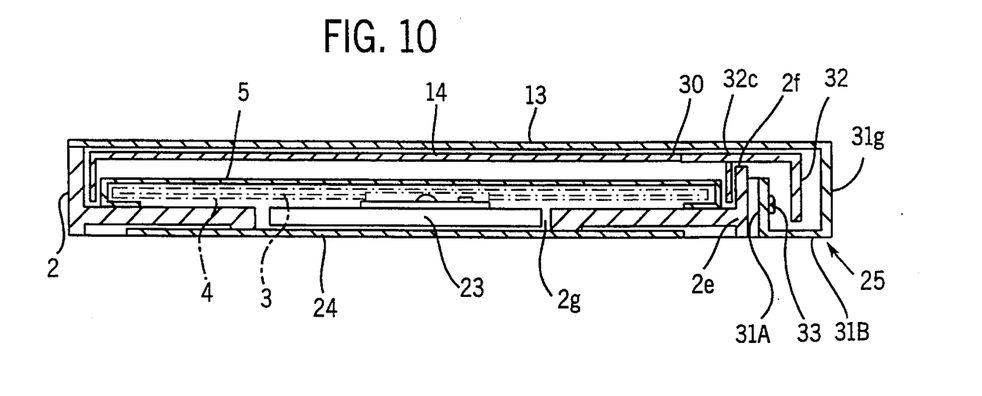
FIG. 10 is a sectional front view illustrating the disk drive unit under a condition in which the disk case is loaded therein.
Figure 11:
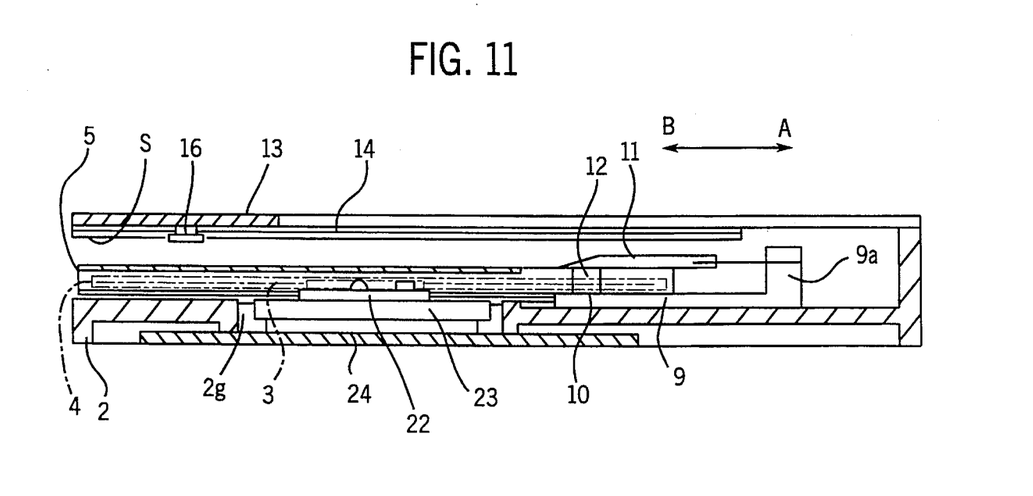
FIG. 11 is a sectional side view illustrating the disk drive unit under a condition in which the disk case is loaded therein.

Before the disk case 4 is loaded in the magnetic disk drive unit 1, the magnetic disk drive unit 1 is maintained in a state as shown in FIGS. 6 and 9. That is, the slider 14 slides in the direction A and is stopped at a predetermined position, so that the holder 5 and the arm 11 of the magnetic head assembly 8 are lifted up and the holder 5 is positioned at the pre-insertion position. In this state, when the disk case 4 is inserted into the holder as shown by the chained line in FIGS. 1, 6 and 9, the front end of the disk case 4 moves in the direction A and hits on the stopper 19a of the latch lever 19. When the disk case 4 is further pressed in the direction A, the latch lever 19 is rotated in the clockwise direction. The engagement portion 19b engaged with the engaging hole 14e is then separated from the engagement portion 14e2 and moves to the slot 14e1. As a result, the slider 14 is released from a latching of the latch lever 19, so that the slider 14 is pressed by the spring 18 and slides in the direction B while being supported by the guide pins 16 fixed on the cover plate 13. When the slider 14 slides in the direction B, the pins 5f of the holder 5 are guided by inclined slits 14f of the slider 14, so that the holder 5 is lifted down from the pre-insertion position to the loading position as shown in FIGS. 10 and 11. When the holder 5 is positioned at the loading position, the magnetic disk 3 in the disk case 4 is set on the turn-table 22.

When the holder 5 is lifted down, the arm 11 is pivoted around a point on the base end block 9a in the counterclockwise direction and the upper magnetic head 12 is lowered. When the disk case 4 is inserted into the holder 5, the shutter of the disk case 4 is opened by the pin 16a mounted at the end of the lever 16 pivoted in the counterclockwise direction. Thus, when the magnetic disk 3 is set on the turn-table 22, the upper magnetic head 12 and the lower magnetic head 10 are in contact with the surfaces of the magnetic disk 3. After this, the turn-table 22 is rotated by the flat motor 23, and the magnetic disk 3 is rotated. In this state, the magnetic recording and/or reproducing are performed via the upper and lower magnetic heads 12 and 10 on the magnetic disk 3.

In a state where the magnetic disk 3 is not being rotated, the ejecting button 26 is pushed in the direction A. Due to this operation, the operating lever 32 slides in the direction A. As a result, the slider 14 is pushed by the engaging plate 32c of the operating lever 32 and slides in the direction A. When the slider 14 slides in the direction A, the pins 5f of the holder 5 are guided by the inclined slits 14f so that the holder 5 is lifted up from the loading position to the pre-insertion position. In addition, when the slider 14 slides in the direction A, the latch lever 19 is pivoted in the counterclockwise direction D, and the engagement portion 19b of the latch lever 19 is engaged with the engagement portion 14e2 of the engaging hole 14e of the slider 14. Due to the pivoting of the latch lever 19, the disk case 4 is pushed by the stopper 19a of the latch lever 19 and the disk case 4 is ejected from the holder 5 positioned at the pre-insertion position.

Figure 3:
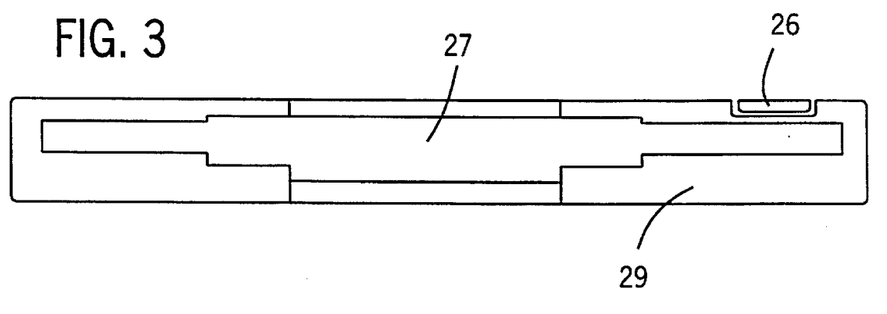
FIG. 3 is a front View illustrating a second type of disk drive unit having an eject button provided at the upper side of the insertion opening.
Figure 12:
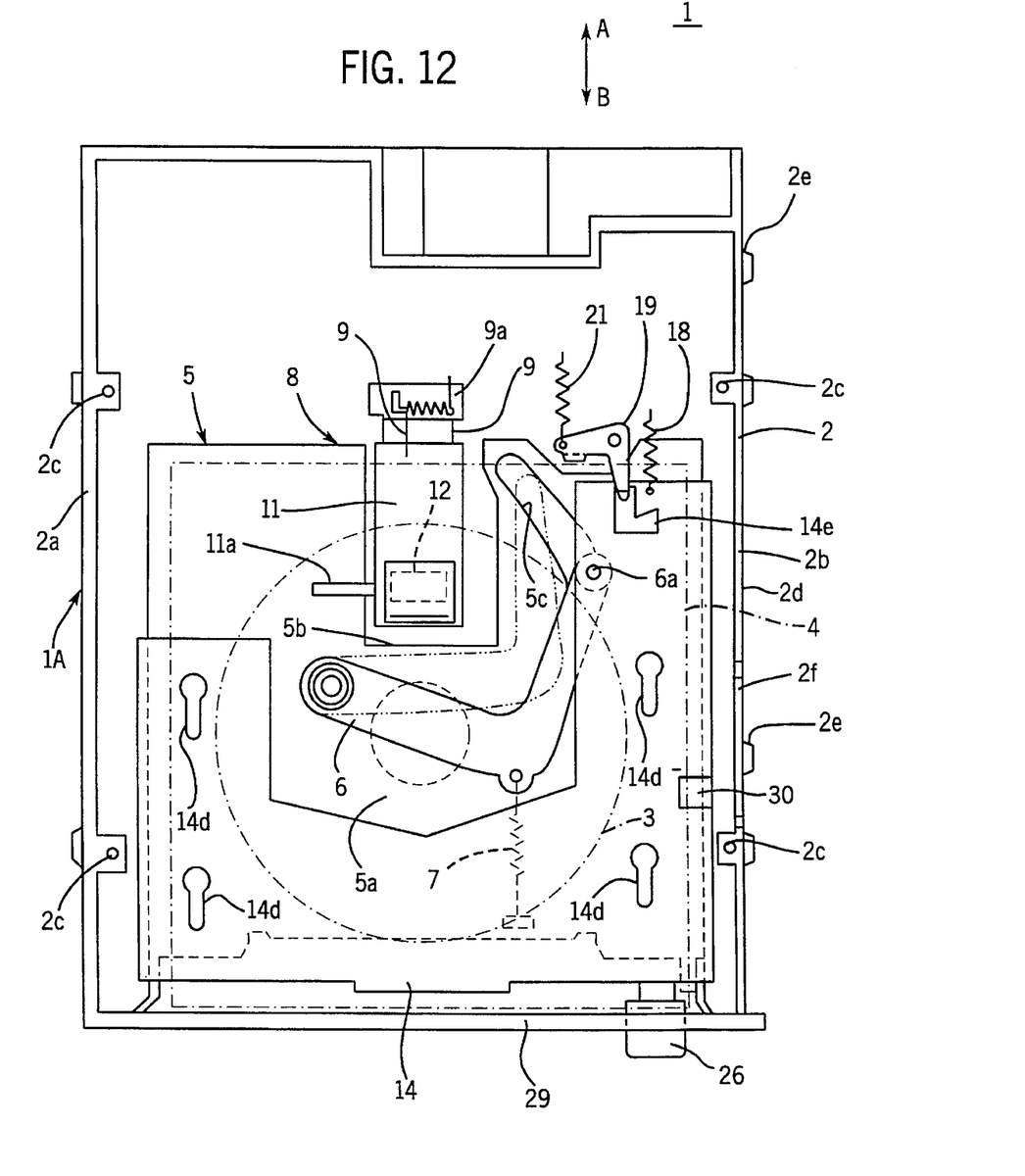
FIG. 12 is a plan view illustrating the internal structure of the disk drive unit under a condition in which the ejecting operation unit is removed therefrom.

Another type of magnetic disk drive unit is shown in FIG. 12. In this type of magnetic disk drive unit shown in FIG. 12, the ejecting operation unit 25 is not attached to the frame 2. In stead of the ejecting operation unit 25, the ejecting button 26 is mounted on the mounting part 14g of the slider 14. Thus, the width of the magnetic disk drive unit is smaller than the width of that described above with reference to FIGS. 1, 2 and 4–11. A bezel 29 on which the insertion opening 27 is formed is substituted for the bezel 28 used in the magnetic disk drive unit 1 shown in FIGS. 1, 2 and 4–11. The ejecting button 26 mounted on the mounting part 14g of the slider 14 is positioned over the insertion opening 27 as shown in FIG.3. The main body 1A of this type of magnetic disk drive unit shown in FIG. 3 and 12 is the same as that of the above type of magnetic disk drive unit shown in FIGS. 1, 2 and 4–11.

According to the above embodiments, the first type of magnetic disk drive unit shown in FIG. 1, 2 and 4–11 shares the main body 1A with the second type of disk drive unit shown in FIG.3 and 12. That is, in the production process of the first type of the magnetic disk drive unit, the bezel 28 and the ejecting operation unit 25 are attached to the frame 2 of the main body 1A, and in the production process of the second type of the magnetic disk drive unit, the bezel 29 different from the bezel 28 is attached to the frame 2 of the main body 1A and the eject button 26 is mounted on the mounting part 14g of the slider 14 in the main body 1A. Thus, the productivity of the first and second types of magnetic disk drive units can be improved.

In a state where the magnetic disk drive unit is mounted in the equipment such as a personal computer, the arrangement of the ejecting button 26 can be changed from the first type to the second type and vice versa.

The concept of the above embodiments can be applied to other disk drive units, such as an optical disk drive unit and a magneto-optic disk drive unit.

The present invention is not limited to the aforementioned embodiments, and variations and modifications may be made without departing from the scope of the claimed invention.

What is claimed is:

1. A disk drive unit which incorporates a single operation device selected from a plurality of different types of operation devices, each of the plurality of different types of Operation devices being locatable, when used, at a different position with respect to the disk drive unit, said disk drive unit possessing versatility, manufacturing flexibility, and economy and comprising:

a main body;

a loading/ejecting mechanism mounted on said main body for loading a recording disk set at an initial position to a loading position and for returning said recording disk from the loading position to the initial position, said loading/ejecting mechanism being provided with at least first and second coupling elements, each of which selectively couples said loading/ejecting mechanism to a different type of operation device, a first of said coupling elements being suitable for coupling said loading/ejecting mechanism to a first type of operation device located in a first position with respect to said main body, a second of said coupling elements being suitable for coupling said loading/ejecting mechanism to a second type of operation device located in a second position with respect to said main body which is different than said first position;

a driving mechanism for driving said recording disk set at the loading position by said loading/ejecting mechanism;

a head assembly for recording and/or reproducing information to and/or from said recording disk set at the loading position; and a single selected operation device comprising one or the other of said first or second types of operation devices, said single selected operation device being located at the respective one of said first or second positions and being coupled to the respective one of said first or second coupling elements for operating said loading/ejecting mechanism so that said recording disk is returned from the loading position to the initial position, the other of said first or second coupling elements not being coupled to an operation device.

2. The disk drive unit as claimed in claim 1 wherein said main body includes a frame, and wherein said selected operation device is of the first type and is mounted on said frame.

3. The disk drive unit as claimed in claim 2 wherein said frame has a side wall located along one side of said loading/ejecting mechanism and wherein said selected first type of operation device is located on said side wall of said frame so as to be positioned to the side of said loading/ejecting mechanism.

4. The disk drive unit as claimed in claim 3 wherein said selected first type of operation device is removably attached to said frame.

5. A disk drive unit as claimed in claim 3 wherein said disk drive unit is suitable for use in associated equipment, and wherein said selected first type of operation device is provided with a mounting portion by means of which said disk drive unit is mounted in said equipment.

6. The disk drive unit as claimed in claim 1 wherein said loading/ejecting mechanism has an ejection member linearly movable in a predetermined direction, linear movement of said ejection member in the predetermined direction making said recording disk return from the loading position to the initial position, wherein said ejection member is provided with said first and second coupling elements and wherein said selected operation device comprises an operation device of the first type comprising a linkage mechanism and an eject button for actuating said linkage mechanism, said linkage mechanism being engageable with said first of said coupling elements provided on said ejection member, so that pushing said eject button linearly moves said ejection member in the predetermined direction for returning said recording disk from the loading position to the initial position.

7. The disk drive unit as claimed in claim 1 wherein said loading/ejecting mechanism has an ejection member linearly movable in a predetermined direction, linear movement of said ejection member in the predetermined direction making said recording disk return from the loading position to the initial position, wherein said ejection member is provided with said first and second coupling elements, and wherein said selected operation device comprises an operation device of the second type comprising an eject button mounted on said second coupling element provided on said ejection member, so that pushing said eject button linearly moves said ejection member in the predetermined direction for returning said recording disk from the loading position to the initial position.

8. A disk drive unit in which information is recorded to and/or reproduced from a recording disk set at a recording/reproducing position, said disk drive unit incorporating a single operation device selected from a plurality of operation devices, each of the plurality of operation devices being locatable, when used, at different positions with respect to the disk drive unit, said disk drive unit possesses versatility, manufacturing flexibility, and economy and comprising:

a main body having a frame;

a holder suitable for receiving the recording disk and movable between a loading position corresponding to the recording/reproducing position and an initial position;

a slider causing said holder to move between the loading position and the initial position, said slider having at least first and second coupling elements, each of which selectively couples said slider to a different type of operation device, a first of said coupling elements being suitable for coupling said slider to a first operation device located in a first position with respect to said main body, a second of said coupling elements being suitable for coupling said slider to a second operation device located in a second position with respect to said main body different from said first position; and a single selected operation device comprising a first type of operation device and comprising a slide linkage mechanism mounted on said frame and slidable with respect to said main body and an eject button coupled to said slide linkage mechanism, said slide linkage mechanism engaging a first of said coupling elements of said slider so that movement of said slide linkage mechanism as a result of a pushing operation on said eject button is transmitted to said slider so that said slider causes said holder to move between the loading and the initial positions, said second of said coupling elements not being coupled to an operation device.

* * * * *